US008892572B2

(12) United States Patent
Sanjeev

(10) Patent No.: US 8,892,572 B2
(45) Date of Patent: Nov. 18, 2014

(54) VIDEO SEARCH SYSTEM AND METHOD OF USE

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 265 days.

(21) Appl. No.: 13/341,606

(22) Filed: Dec. 30, 2011

(65) Prior Publication Data

US 2013/0173635 A1  Jul. 4, 2013

(51) Int. Cl.
*G06F 17/30* (2006.01)

(52) U.S. Cl.
USPC ............... 707/748; 707/755; 707/E17.004

(58) Field of Classification Search
CPC ........... G06F 17/30781; G06F 17/30784; G06F 17/30823; G06F 17/30825; G06F 17/380858
USPC ............. 707/707, 754, 755, E17.004, E17.28
See application file for complete search history.

(56) References Cited

U.S. PATENT DOCUMENTS

| 6,243,713 | B1 * | 6/2001 | Nelson et al. ......................... 1/1 |
| 7,680,324 | B2 | 3/2010 | Boncyk et al. |
| 8,326,043 | B2 * | 12/2012 | Cavet ............................ 382/190 |
| 2002/0159640 | A1 * | 10/2002 | Vaithilingam et al. ........ 382/218 |
| 2005/0162523 | A1 | 7/2005 | Darrell et al. |
| 2006/0002607 | A1 * | 1/2006 | Boncyk et al. ................. 382/165 |
| 2006/0280246 | A1 | 12/2006 | Alattar |
| 2008/0098432 | A1 | 4/2008 | Hardacker et al. |
| 2008/0208891 | A1 | 8/2008 | Eang et al. |
| 2009/0324100 | A1 * | 12/2009 | Kletter et al. ................. 382/217 |
| 2010/0085481 | A1 * | 4/2010 | Winter et al. ................. 348/513 |
| 2010/0205174 | A1 * | 8/2010 | Jiang et al. .................... 707/725 |
| 2011/0295851 | A1 | 12/2011 | El-Saban et al. |
| 2012/0008821 | A1 | 1/2012 | Sharon et al. |
| 2012/0011119 | A1 * | 1/2012 | Baheti et al. ................. 707/737 |
| 2013/0006951 | A1 * | 1/2013 | Yu et al. ....................... 707/706 |

OTHER PUBLICATIONS

"Google Goggles-Google Mobile Help," printed Jun. 2, 2011. <http://www.google.com/support/mobile/bin/answer.py?hl=en&answer=166331>.
"Google Goggles," printed Jun. 2, 2011. <http://www.google.com/mobile/goggles/>.

* cited by examiner

*Primary Examiner* — Rehana Perveen
*Assistant Examiner* — Robert F May

(57) ABSTRACT

A system and method identifies a video file in response to a video based search query. A video imaging device in a mobile device captures a video file, and sends the video file to a search engine. A database associated with the search engine stores pre-indexed metadata of pre-indexed frames of video. A video analyzer separates the received video file into individual frames, analyzes the individual frames received from the mobile device by converting the individual frames into metadata, and compares the metadata to the pre-indexed metadata of the pre-indexed frames stored in the database. The video analyzer then sends a message containing information about the identified pre-existing video back to the mobile device based on the comparison of metadata. The metadata of the file and/or the metadata in the database may include one or more of pixel information, histogram information, image recognition information and audio information for each individual frame.

16 Claims, 5 Drawing Sheets

VIDEO SEARCH SYSTEM AND METHOD OF USE

BACKGROUND

The use of hand held mobile stations for recording digital images has revolutionized the world. Similarly, conducting searches for information using mobile stations has greatly increased the speed at which hand held users can obtain information. For example, obtaining information while traveling in an automobile or walking on the street saves a significant amount of time and expense.

Combining the search function and camera function of a mobile station allows for a user to search based upon a digital image. Key words or other search criteria are extracted from a digital image, captured, for example, using the camera in a mobile station; and the search criteria are submitted to a search engine to obtain information of interest which is transmitted back to the mobile device and presented to the user.

Some systems for matching images taken with a mobile phone compare the images to images in a database. This allows users to quickly identify an object of interest. This system also uses key word extraction in order to search the database to identify an object.

These search techniques have processed still images. Modern hand held mobile devices often can also capture videos or "motion pictures." However, the use of a hand held device to identify a video program, such as a movie or a television program, may require a more robust search method.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
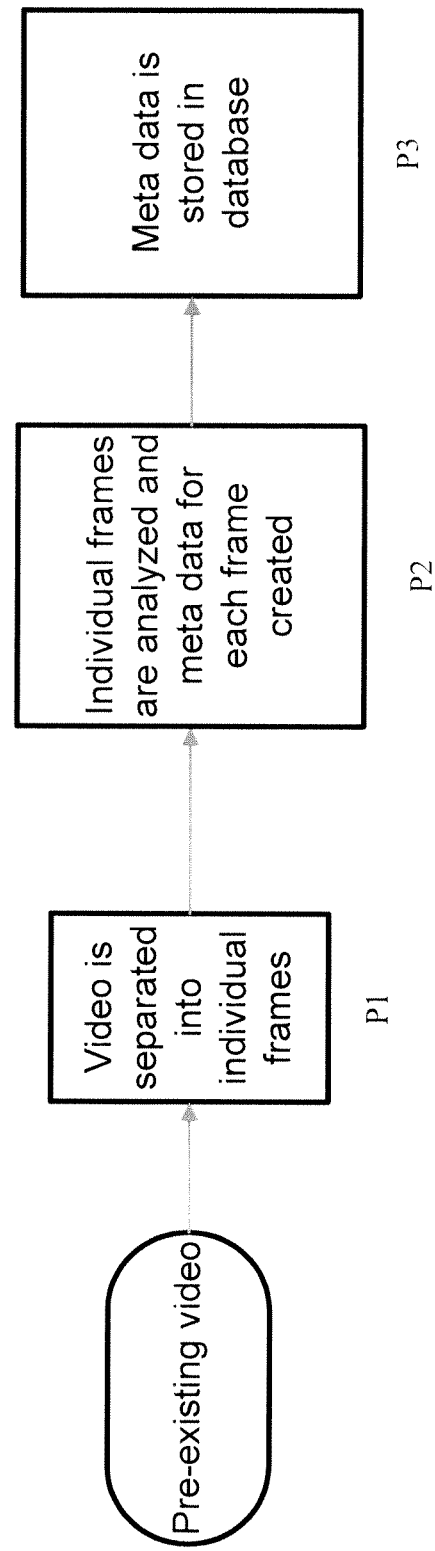
FIG. 1 is a diagram for the video parsing of individual frames of pre-indexed video files for use in a video based search.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The present disclosure is directed to a system for identifying a video file, such as from a television program or movie. The system comprises a network interface configured to enable a mobile device to capture a video file comprising a plurality of frames, and to send said video file through a mobile communication network to a server. A processor in the system is configured to execute computer-implemented programs. The system also has a storage device configured to store pre-indexed metadata of pre-indexed frames of pre-existing videos, and a program associated with the server. The processor configures the system to perform functions, including functions to separate the video file received from the mobile device into individual frames, convert the individual frames into metadata for the video file, compare the metadata for the video file to the pre-indexed metadata of the pre-indexed frames of pre-existing videos stored in the database, and send a message containing information about the identified pre-existing video back to the mobile device.

The metadata for the video file includes pixel information, histogram information, image recognition information and audio information for each individual frame of the video file, although in other embodiments the user may be able to review the video file and adjust the image in each frame to be compared and/or which frames are to be compared. The pre-indexed metadata similarly includes pixel information, histogram information, image recognition information and audio information for each pre-indexed frame for the pre-existing videos. The metadata for the video file and pre-existing videos thus may have the same (or at least overlapping) characteristics.

The pixel information includes the color intensities for and location of each pixel in a frame. Histogram information includes a representation of the distribution of colors in a frame. Image recognition information concerns an image that can be identified in a search. Audio information is the sound portion of a video that, if speech, can be converted to text.

The program assigns a numeric value to each comparison of the metadata for each individual frame of the video file to the pre-indexed metadata based on an amount by which an individual frame matches the pixel information, the histogram information, the image recognition information and the audio information of each pre-indexed frame. Numeric values are assigned for comparison of each characteristic: pixel information, histograms, image recognition and audio information. Then, a composite numeric value is obtained by combining the numeric values of each characteristic.

In assigning the numeric values of each comparison of the metadata for each individual frame of the video file and the pre-indexed metadata, the relative values of the pixel information, the histogram information, the image recognition information and the audio information may be weighted.

The present disclosure is also directed to a method for searching video comprising receiving a video file comprising a plurality of frames from a mobile device, separating the video file into a plurality of individual frames, converting each individual frame into metadata for the video file, comparing the metadata of each individual frame of the video file to pre-indexed metadata of pre-indexed frames of pre-existing videos stored in a database, identifying one of the pre-existing videos as corresponding to the received video file based on the comparison between the metadata of each individual frame of the video file to each pre-indexed metadata of the pre-indexed frames, and sending a message containing information about the identified pre-existing video back to the mobile device.

Another embodiment of the present disclosure is directed to a video analyzer for analyzing and identifying video. The video analyzer is configured to receive a video file comprising a plurality of frames from a mobile device, separate the video file into a plurality of individual frames, convert each individual frame into metadata for the video file, compare the metadata for the video file to pre-indexed metadata of pre-indexed frames of pre-existing videos stored in a database, identify one of the pre-existing videos as corresponding to the received video file based on the comparison between the metadata of each individual frame for the video file to each pre-indexed metadata of the pre-indexed frames, and send a message containing information about the identified pre-existing video to the mobile device.

In another embodiment, the system comprises a video imaging device configured to capture a video file comprising a plurality of frames. A mobile device sends the video file through a mobile communication network. The mobile device may be coupled to the video imaging device. The system also has a database configured to store pre-indexed metadata of pre-indexed frames of pre-existing videos, and a video analyzer associated with the server, configured to separate the video file received from the mobile device into individual frames, convert the individual frames into metadata for the video file, compare the metadata for the video file to the pre-indexed metadata of the pre-indexed frames of pre-existing videos stored in the database, and send a message containing information about the identified pre-existing video back to the mobile device.

Reference now is made in detail to the examples illustrated in the accompanying drawings and discussed below.

Video parsing may be used for content based video indexing and retrieval. To have an effective video identification system, pre-existing videos, including movies, television shows, and the like are indexed so that the videos can be searched and identified. Video parsing involves two steps: segmentation and indexing. As is shown in the exemplary process in FIG. 1, a pre-existing video is segmented by splitting a video, for example, a movie such as Star Wars™ into individual frames in step P1. After segmentation, each frame is then analyzed to create a searchable medium in step P2. During analysis, metadata information such as pixel information, histogram information, image recognition information and audio information is stored. After indexing, the metadata is stored to create a database of pre-indexed metadata derived from the pre-indexed frames in step P3.

Pixel information is derived from obtaining information of each individual pixel of a pre-existing video. Pixels are normally arranged in a two-dimensional grid, and are often represented using dots or squares. Each pixel can be identified by an address. The address of a pixel corresponds to its coordinates. Data for a frame can be decoded to produce the desired intensity and color for each pixel.

The intensity of each pixel is variable. In color image systems, a color is typically represented by three or four component intensities such as a value of intensity of red, a value of intensity of green, and a value of intensity of blue (r, g, b intensities) or a value of intensity of cyan, a value of intensity of magenta, a value of intensity of yellow, and a value of intensity of black. Thus, each frame can be represented by a listing of the color intensities, and the address of each of its pixels. In one example, each frame of a video is analyzed. The r, g, b intensities and the address of each pixel of each frame of the pre-existing video are identified and made into a data set representing the pixel information for that frame. This data set can be compared to a received video file.

A pre-existing video is decoded from its original format into a format to obtain the pixel data. The pixel data is then processed into the component of metadata relating to pixel information.

A color histogram is a representation of the distribution of colors in a frame. For digital frames, a color histogram represents the number of pixels that have colors in each of a fixed list of color ranges that span the frame's color space, the set of all possible colors. For monochromatic frames, the term intensity histogram may be used instead.

If the set of possible color values is sufficiently small, each of those colors may be placed on a range by itself; then the histogram is merely the count of pixels that have each possible color. Most often, the space is divided into an appropriate number of ranges, often arranged as a regular grid, each containing many similar color values. The color histogram may also be represented and displayed as a smooth function defined over the color space that approximates the pixel counts.

Like other kinds of histograms, the color histogram is a statistic that can be viewed as an approximation of an underlying continuous distribution of colors values. Color histograms are flexible constructs that can be built from frames in various color spaces, whether RGB, rg chromaticity or any other color space of any dimension. A histogram of a frame is produced first by discretization of the colors in the frame into a number of bins, and counting the number of pixels in each bin. For example, a Red-Blue chromaticity histogram can be formed by first normalizing color pixel values by dividing RGB values by R+G+B, then quantizing the normalized R and B coordinates into N bins each.

The histogram provides a compact summarization of the distribution of data in a frame. The color histogram of a frame is relatively invariant with translation and rotation about the viewing axis, and varies only slowly with the angle of view. By comparing histograms signatures of two frames and matching the color content of one frame with the other, the color histogram is particularly well suited for the problem of recognizing an object of unknown position and rotation within a scene. Importantly, translation of an ROB frame into the illumination invariant rg-chromaticity space allows the histogram to operate well in varying light levels.

Image recognition is a means by which an object in a frame is converted into key words or other search criteria and then used as a search query to search a database. The search criteria may be derived readily, such as a telephone number or text that required no conversion into a key word. Other objects, such as a human face, may require image analysis to determine if the face is known or searchable. If so, identification of the person may be conducted, and the person's name made into a search term. Other objects such as an automobile may be searched either for the make and model of the automobile. If indeterminable, the type of automobile (e.g., sports car, bus) can be a search term.

The search criteria are submitted to a search engine to obtain information of interest. The search engine may be part of a server dedicated to searching pre-indexed movies or television programs as described below.

In addition, the audio portion of the pre-existing video may be converted to text using speech recognition software, such as Nuance® speech recognition technology. After conversion to text, the text is searchable. Since audio is a characteristic of a video file, the audio information can be utilized to aid in the search. Thus, when a frame of the video is compared to the pre-existing videos, the text of the audio can also be compared to verify or help find a match.

After indexing the metadata, the metadata is stored in the database to be utilized when a search is performed.

Figure 2:
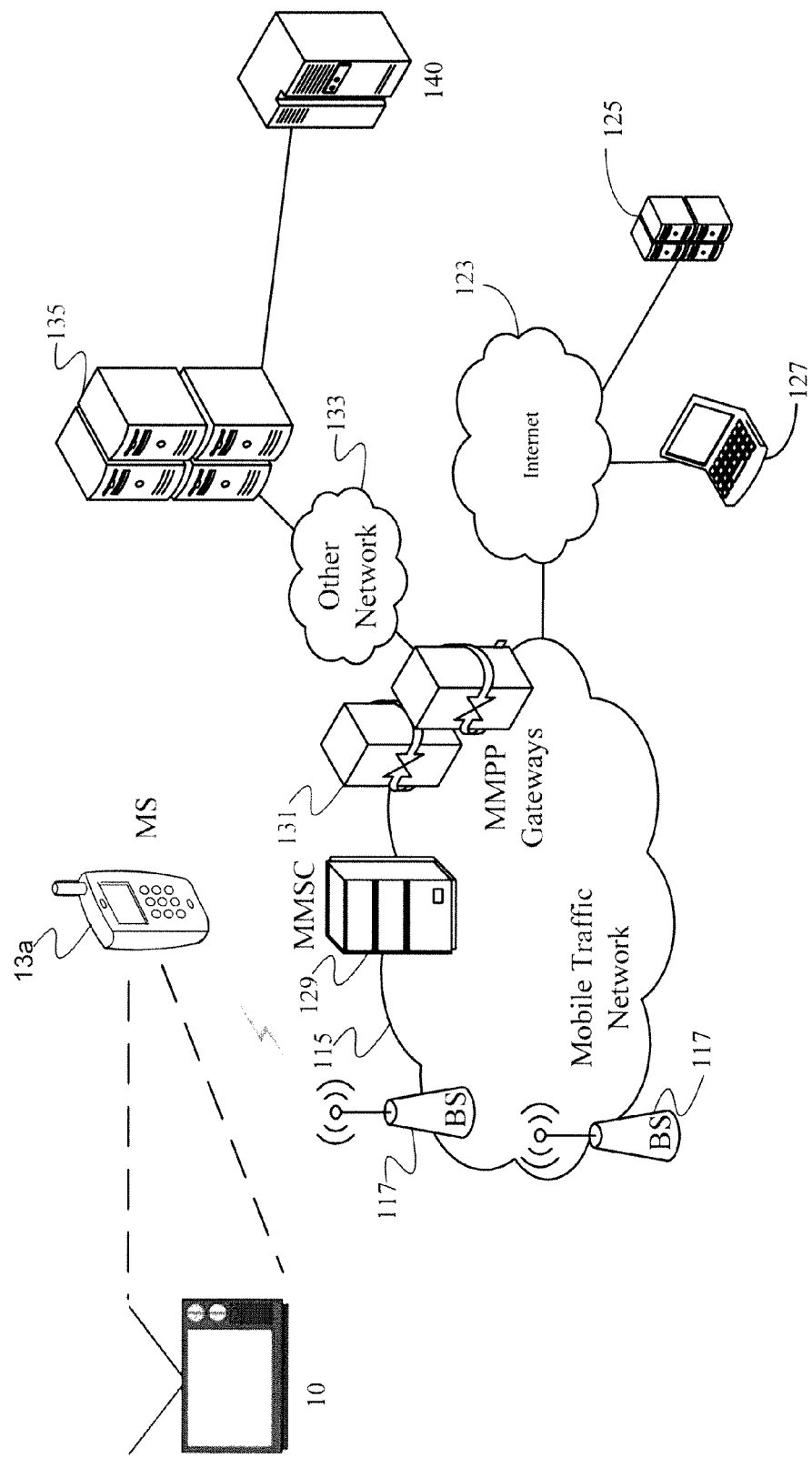
FIG. 2 is a high-level functional block diagram of an example of a system of networks/devices that provide various communications for mobile stations and support an example of the video searching service.

FIG. 2 shows how a video searching system can be utilized with a hand held mobile station according to one example. In this example, a hand held mobile station 13a records video data by pointing the mobile station 13a at a source 10, such as a television screen, a movie screen, or a computer monitor. A video is captured, digitized and compressed to form a digital file.

A message is then generated containing the video file. A wireless communication transmitter in the mobile station 13a sends the message through a wireless communication network 115 addressed for delivery to a server 135 that offers a video based search engine service. The server 135 accesses a database 140 which stores metadata of pre-existing videos to compare with the recorded video file in order to identify one of the pre-indexed videos as corresponding to the received video file.

The network 115 often (but not always) comprises individual networks operated by a number of different mobile communication service providers, carriers or operators; although for simplicity of discussion the network 115 is assumed to be a network operated by one carrier. The communication network 115 provides mobile voice telephone communications as well as other services such as text messaging and various multimedia messaging and packet data services, for numerous mobile stations. One type of mobile station shown in the drawing is users' mobile station 13a. The network supports a variety of application services, using mobile network messaging services as the transport mechanism, where application servers/service providers offer application services typically identified by short codes. The mobile station 13a has capabilities to communicate via the wireless mobile communication network 115.

In addition to voice calls and data services, the network 115 may support one or more mobile services. Examples of such services include SMS, EMS (Enhanced Messaging Service) and MMS (Multimedia Messaging Service). Although the present teachings may be applied to any of these or other types of messaging services, for purposes of a specific example to discuss here, we will assume that the network 110 allows SMS type text messaging and MMS type multimedia messaging between the mobile station 13a and similar messaging with other devices, e.g. via the Internet.

The wireless mobile communication network 115 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 13a would be configured to communicate in accord with the wireless standard supported by the network 115 although many mobile stations have the capability of communicating via a number of networks that may utilize different standardized technologies (multi-mode devices).

The mobile communication network 115 typically is implemented by a number of interconnected networks. Hence, the overall network 115 may include a number of radio access networks (RANs), as well as regional ground networks interconnecting a number of RANs and a wide area network (WAN) interconnecting the regional ground networks to core network elements, such as MMS messaging centers (MMSCs) 129 and/or SMS messaging centers (SMSCs—not shown). A regional portion of the network 115, such as that serving the mobile station 13a will typically include one or more RANs and a regional circuit and/or packet switched network and associated signaling network facilities.

Physical elements of a RAN operated by one of the mobile service providers or carriers include a number of base stations represented in the example by the base stations 117. Although not separately shown, such a base station (BS) 117 typically comprises a base transceiver system (BTS) which communicates via an antenna system at the site of the base station and over the airlink with the mobile station 13a, when the mobile station 13a is within range. Each base station (BS) 117 typically includes a BTS coupled to several antennas mounted on a radio tower within a coverage area often referred to as a "cell." The BTS is the part of the radio network that sends and receives RF signals to/from the mobile station 13a that the BS 117 currently serves.

The radio access networks also include or connect to a traffic network represented generally by the cloud shown at 115, which carries the user communications for the mobile station 13a between the base stations 117 and other elements with or through which the various wireless mobile stations communicate. Individual elements such as switches and/or routers forming the traffic network 115 are omitted here for simplicity.

For purposes of the discussion of handling of messaging traffic related to the video file based search, an MMS type implementation of the messaging service that carries or transports the data portion of the video image communications through the network 115 is described initially. However, other types of the transport methods available in the typical wireless mobile communication network 115 may be utilized, and that the present concepts are equally applicable using those other types of transport methods through the network. For example, another way to send a video is via IP packet communication, similar to sending a search query containing an image to a search engine website.

A mobile station 13a communicates over the air with a base station 117 and through the traffic network 115 for various voice and data communications. If the mobile service carrier offers the video searching service, the service may be hosted on a carrier operated application server 135, for communication via the network 115 and the carrier's private data network 133. Alternatively, the video service may be provided by a separate entity (alone or through agreements with the carrier), in which case, the service may be hosted on an application server such as server 125 connected for communication via the networks 115 and 133, although the carrier's network 115 supports communications between the mobile devices 13a and the appropriate search engine server.

Servers such as 125 and 135 may provide any of a variety of common application or service functions in support of or in addition to an application program running on the mobile station 13a. However, for purposes of further discussion, the focus remains on functions thereof in support of the mobile video searching service. For a given service, including the video searching service, an application program within the mobile station may be considered as a 'client' and the programming at 125 or 135 may be considered as the 'server' application for the particular service.

The enhanced video searching service under consideration here may be delivered to touch screen type mobile stations as well as to non-touch type mobile stations. Our simple example shows the mobile station (MS) 13a as a non-touch type mobile station. Implementation of the on-line video searching service may involve at least some execution of programming in the mobile stations as well as implementation of user input/output functions and data communications through the network 115, from the mobile stations.

Figure 3:
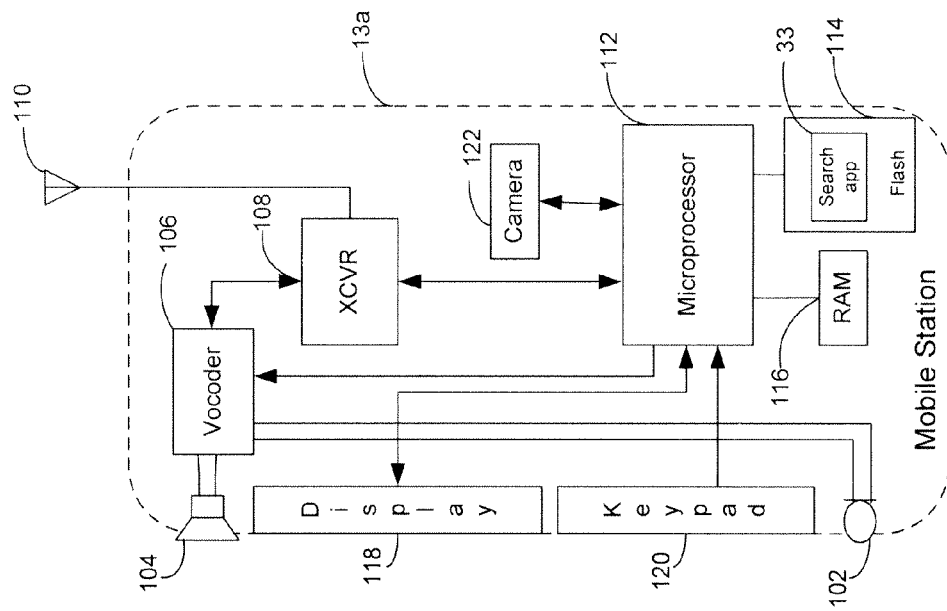
FIG. 3 is a high-level functional block diagram of an exemplary non-touch type mobile station as may utilize the video searching service through a network/system like that shown in FIG. 2.

For purposes of such a discussion, FIG. 3 provides a block diagram illustration of an exemplary non-touch type mobile station 13a. Although the mobile station 13a may be a smartphone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a may be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., including search and results screens for the video searching service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102, and speaker 104 may be used as the physical input output elements of the graphical user interface (GUI), for multimedia (e.g., audio and/or video) communications. A camera 122 is added to capture video for submission to the searching service. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during searching.

A microprocessor 112 serves as a programmable controller for the mobile station 13a, in that the microprocessor 112 controls all operations of the mobile station 13a in accord with programming that the microprocessor 112 executes, for all normal operations, and for operations involved in the video searching procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. A search application 33 may be included in the programming for the mobile device 13a stored in memory 114. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing video searching.

Wireless carriers developed the Multimedia Messaging Service (MMS) to transmit text messages for display on the mobile station. In many existing network architectures, the MMS traffic uses the signaling portion of the traffic network 115 to carry message traffic between a Multimedia Message Service Center (MMSC) 129 and the mobile station 13a. The MMSC 129 supports mobile station to mobile station delivery of text messages. However, the MMSC 129 also supports communication of messages between the mobile stations and devices coupled to other networks. The Multiple-Message-Per-Process (MMPP) gateway 131 provides protocol conversions, between MMPP as used by the MMSC 129 and the protocols used on the IP network 133. MMPP messages ride on IP transport, e.g. between the gateway 131 and the MMSC 129. SMSCs (not shown) function in a manner similar to MMSCs, but handle short text messages instead of multimedia messages.

The exemplary system also includes one or more other packet communication networks 133 connected to the mobile network 110. The other packet communication network 133 may be a private packet data network operated by the same carrier that operates network 110 for its own purposes, or the other packet communication network 133 may be a secure network interconnected among several parties working together to provide certain secure services.

In the example, the other packet communication network 133 provides packet data communications between the MMPP gateway 131 and the traffic network 115, for a number of application servers. Of note for purposes of this discussion of video imaging, one such application server 135 is designed specifically to process MMS messages from mobile stations 13a and forward the messages to one or more associated databases 140. The server 135 has software designed for the receive a video image message sent from a mobile station 13a, through the wireless communication network 115, converting the video images into metadata for analysis of the video images, interacting with the database 140 to identify the video image received from the mobile station 13a, and sending the video identification back to the mobile station 13a.

Figure 4:
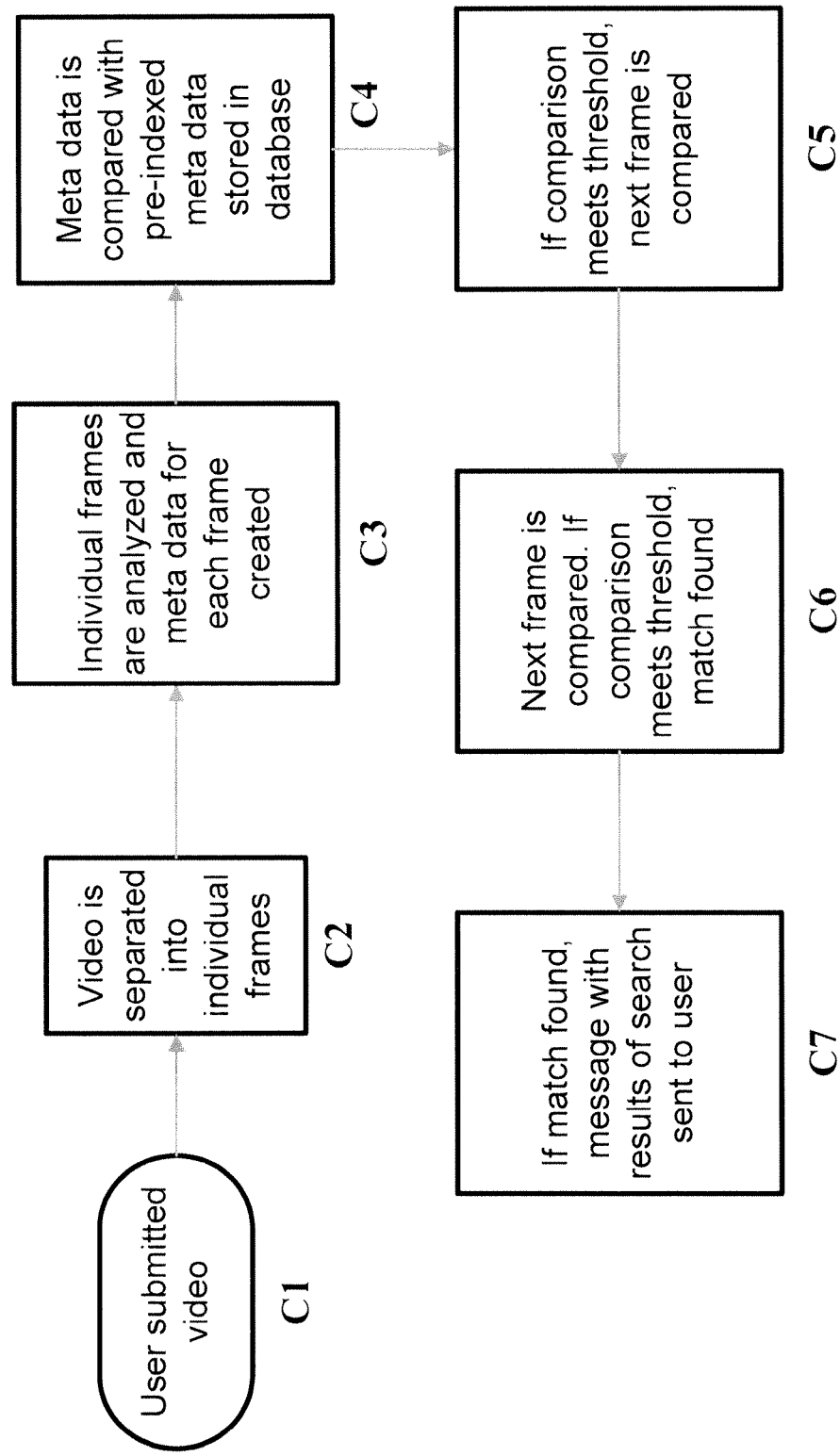
FIG. 4 is a flow chart illustrating an embodiment of a video identification method.

FIG. 4 shows how one embodiment of the video searching method or system of the present disclosure operates. A user submits a video file to the server for search in step C1. In the server, the video file is then separated into multiple individual frames in step C2. Then, in a manner similar to that described for the pre-indexed video frames, the user submitted video is processed into metadata, such as pixel information, histogram information, image recognition information and audio information in step C3. Since the format of the video file submitted by the user may be different than the format of the pre-existing video, the processing to form the metadata for the user submitted video file and the pre-existing video may be different. However, after processing, the metadata for the video file and the metadata for the pre-existing videos have the same format, so that when the metadata of each individual frame is compared to pre-indexed metadata of pre-indexed frames stored in the database in step C4, a consistent comparison can be made. Any suitable format may be used as the common format after processing. For example, 3g2 can be used as the format when the user submitted videos and the pre-existing videos are compared.

A numeric value is assigned for each comparison by each individual frame to the pre-indexed metadata based on an amount by which each individual frame matches the pixel information, the histogram information, the image recognition information and the audio information of each pre-indexed frame. In one embodiment, each characteristic is compared separately and then the results are combined into an overall match (also referred to herein merely as a match).

The numeric values of the metadata may be weighted such that the various metadata elements are given different importance, and the video file is identified based on the comparison between the metadata of each individual frame to each pre-indexed metadata of the pre-indexed frames. Different weightings between characteristics may be used, depending on the embodiment. For example, audio inside video may be more relevant than vehicles or furniture inside a frame, and thus audio matching may be given a greater weighting than image recognition in this case. Alternatively, image recognition of a face may be given a greater weighting than audio if a match is likely for the former. The relative importance of each characteristic can be defined beforehand.

As above, each characteristic of the metadata is matched separately for each frame. Once a match that meets a predetermined threshold is found, for example, between the nth frame in the video file and a pre-indexed video, then a comparison is made for (n+1)th and/or (n−1)th frame of the video file and that of the pre-indexed video. The user may define the number of consecutive frames that are to be matched before ending further search of the video file (either numerically or by category such as "good," "better," "best). Alternatively, this number may be a default provided by the application used to provide video matching.

For example, following weighted average can be used:
Pixel information: 20%
histogram information: 20%
Image recognition information: 30%
Audio information (as text): 30%

During search, all metadata is used to search for a best match in the database. Each user submitted video is given a numerical score indicating the closeness of the match to a certain pre-indexed frame. The higher the numerical score is, the closer the match. In one example, the best match is given a score of 100 and the worst match is given score of 0. Below is example of one of the frame result:
Pixel information: 88
Histogram information: 60
Image recognition information: 100
Audio information (as text): 90

After analysis, the weighted average for the above example is: (20*88+30*60+30*100+30*90)/100=92.6.

After finding the best match or if the comparison meets a predetermined threshold, the system may match the next frame with next frame in database in step C5. When the number of matches that exceed the threshold and are close together are found in the comparison of the first frame, in one embodiment, only these matches are used in the comparison for the next frame. This process can be repeated until the system finds two consecutive matches that are better than the threshold. For example, the threshold can be defined as weighted average of 50 for two consecutive frames. The threshold is determined beforehand and may be fixed for a particular search, but may vary from search to search. If the threshold is not met, then no match is found. The threshold can be set at a lower value if there is a large amount of noise in video file. The set of videos as potential matches is then reduced to those that meet the threshold.

During pixel matching, the frames are analyzed by overlapping the two frames (from the video file and from the pre-indexed video) to be compared. In one embodiment, if no match is found, or if a threshold amount is not reached, for the frame of the video file, a search for a portion in the frame may be attempted. A unique image or particular histogram value may be used for this portion match method.

If the two frames both meet the predetermined threshold, then a match is determined to be found in step C6. The results of the search are then sent to the user in step C7. The results may include text (e.g., in an SMS message or email) identifying the pre-existing video, or a link to the pre-existing video in the storage unit or database. The results may show merely the best match, or may show a list of all matches that meet the threshold, in order of best match to worst match (and with or without closeness for each match being shown).

If the search query was sent via MMS, the results may be sent via SMS, if the results are in text form, or the reply could be sent via MMS. If the search query was sent via IP packets, then the reply could be sent back using IP packets, for example, for display via a browser as a web page of search results.

As is clear from the above, when the comparison is performed, less than a 100% match may be found with one or more videos; as long as the comparison meets a predetermined threshold, a match can be obtained. It is also possible to have a match that is less than the threshold because video captured does not contain all of the elements of the pre-existing video, or extra elements are added into the frame. For example, while capturing video from a television using the mobile station, furniture surrounding television may be captured as well. As a result, the captured video may be very different than the image displayed on the television. Video editing capability can be provided to user so that they can remove noise, such as in the form of objects outside the frame of the television before submitting it for search.

The metadata can be used to provide motion detection information. A frame currently being evaluated may be compared with previously evaluated frames or background. Using pixelwise correlation (laying one frame on top of other frame and counting the number of matches), if the difference is more than a predefined threshold, then a determination is made that motion has occurred. In one embodiment, a minimum of two frames may be used to determine that motion is occurring in a video file. Jitter is to be avoided when capturing the video file for submission in order to reduce the possibility of error.

Another approach to motion detection is to build a background frame (grayscale image). The current frame is compared with a background frame and the changes observed to determine whether there was motion between the frames. Motion of each object in scene is tracked over one frame to another frame. This can be used for comparison along with histogram and pixelwise correlation.

Histogram comparison may be used to detect shot boundaries. The server uses the histogram to compute changes between two adjacent frames. In this method, if a difference between two adjacent frames exceeds a predetermined threshold, then motion is detected.

The comparison between the user-submitted video file and the pre-existing videos, allows for the best match or best matches to the video file to be identified and sent back to the mobile station. The best match is determined by a numeric value assigned to the various characteristics of the metadata, in which each characteristic may be weighed.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the search system. The software code is executable by the general-purpose computer that functions as the search server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for searching for videos, in essentially the manner performed in the implementations discussed and illustrated herein.

Figure 5:
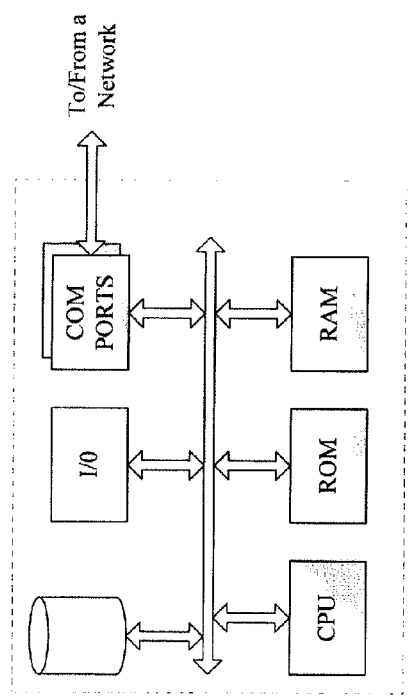
FIG. 5 is a simplified functional block diagram of a computer that may be configured as a host or server, for example, to function as the server in the system of FIG. 2.
Figure 6:
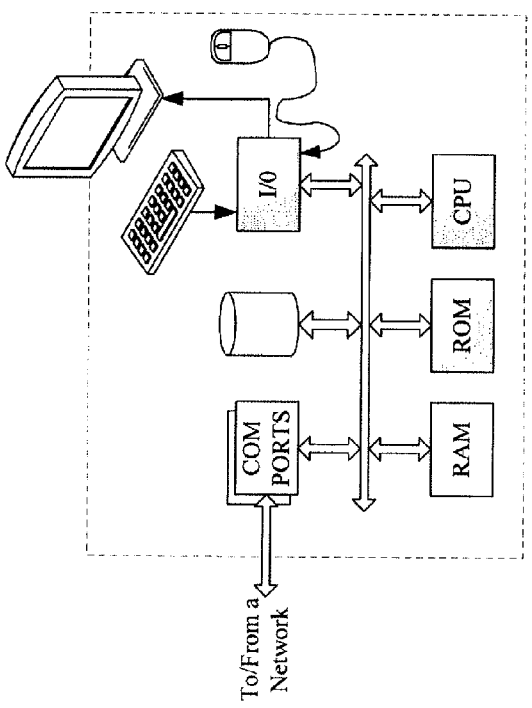
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of video searching outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the database that will be the storage area for the server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Nonvolatile storage media include, for example, optical or magnetic disks, such as any of the storage devices in any computer(s) or the like, such as may be used to implement the video searching, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all parameters, including measurements, values, ratings, positions, magnitudes, sizes, and other specifications that are set forth in this specification, including in the claims that follow, are approximate, not exact. These parameters are intended to have a reasonable range that is consistent with the functions to which the parameters relate and with what is customary in the art to which the parameters pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should the claims be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:
   a network interface configured to enable a mobile device to capture a video file comprising a plurality of frames, and to send said video file through a mobile communication network to a server;
   a processor configured to execute computer-implemented programs;
   a storage device configured to store pre-indexed metadata of pre-indexed frames of pre-existing videos, wherein a plurality of pre-indexed metadata items are stored for each pre-indexed frame; and
   a program associated with the server, wherein execution of the program by the processor configures the system to perform functions, including functions to:
      separate the video file received from the mobile device into individual frames,
      convert the individual frames into metadata for the video file, wherein each individual frame is converted into a plurality of metadata items corresponding to the plurality of pre-indexed metadata items, and
      for each of a plurality of the pre-indexed frames of each of a plurality of the pre-existing videos, compare the plurality of metadata items for one individual frame of the video file to respective pre-indexed metadata items of the pre-indexed frame of the stored pre-existing video by:
         generating a plurality of numeric values each numeric value representing an amount by which each of the metadata items for the individual frame matches a respective pre-indexed metadata item for the pre-indexed frame, and
         combining the plurality of numeric values into a single value,
      identify one of the pre-existing videos that matches the video file based on the plurality of single values corresponding to the respective plurality of pre-indexed frames of the plurality of existing videos,
      selecting ones of the plurality of metadata items in the individual frame and the pre-indexed frame of the identified pre-existing video for which the numeric values exceed a predetermined value;
      comparing next video frame following the one individual frame of the video file to a next pre-indexed video frame following the pre-indexed video frame in the identified pre-indexed video by:
         generating a plurality of further numeric values, each further numeric value representing an amount by which each of the selected metadata items of the next video frame matches the respective metadata item in the next pre-indexed video frame; and
         combining the plurality of further numeric values into a further single value; and
      when a combination of the single value and the further single value is greater than a threshold send a message containing information about the identified pre-existing video based on the results of the comparison back to the mobile device.

2. The system of claim 1, wherein the plurality of metadata items for the video file and the plurality of pre-indexed metadata items include respective metadata items for pixel information, histogram information, image recognition information and audio information for each individual frame and for each pre-indexed frame for the pre-existing videos, respectively.

3. The system of claim 2, wherein the program assigns the respective numeric values to the comparisons of the plurality of metadata items for the individual frame of the video file to the respective plurality of pre-indexed metadata items for the pre-indexed frame based on an amount to which the respective metadata items of the individual frame for the pixel information, the histogram information, the image recognition information and the audio information match the respective pre-indexed metadata items for the pixel information, the histogram information, the image recognition information and the audio information of the pre-indexed frame.

4. The system of claim 3, wherein in assigning the respective numeric values for the comparisons of the plurality of metadata items of the video file and the respective plurality of pre-indexed metadata items, the relative values of the pixel information, the histogram information, the image recognition information and the audio information are weighted.

5. The system of claim 3, wherein in the comparing of the metadata, the single value having a greatest value identifies a best match.

6. A method, comprising the steps of:
receiving a video file comprising a plurality of frames from a mobile device,
separating the video file into a plurality of individual frames,
converting each individual frame into metadata for the received video file, wherein each individual frame is converted into a plurality of metadata items,
for each of a plurality of the pre-indexed frames of each of a plurality of the pre-indexed videos, comparing the plurality of metadata items for one individual frame of the received video file to respective pre-indexed metadata items of the pre-indexed frame of the pre-existing video to:
  generate a plurality of numeric values, each numeric value representing an amount by which each of the metadata items for the individual frame matches the respective pre-indexed metadata item for the pre-indexed frame, and
  combine the plurality of numeric values into a single value;
identify one of the plurality of pre-existing videos as corresponding to the received video file based on the comparison between the metadata items of the individual frame of the video file to the pre-indexed metadata items of the plurality of pre-indexed frames of the plurality of pre-existing videos,
select ones of the plurality of metadata items in the individual frame and the pre-indexed frame of the identified pre-existing video for which the numeric values exceed a predetermined value;
compare a next video frame following the individual frame of the video file to a next pre-indexed video frame following the pre-indexed video frame in the identified one of the pre-indexed video by:
  generating a plurality of further numeric values, each further numeric value representing an amount by which each of the selected metadata items of the next video frame matches the respective metadata item in the next pre-indexed video frame; and
  combining the plurality of further numeric values into a further single value; and
when a combination of the single value and the further single value is greater than a threshold, send a message containing information about the identified pre-existing video based on the results of the comparison back to the mobile device.

7. The method of claim 6, wherein the plurality of metadata items for the received video file and the plurality of pre-indexed metadata items include respective metadata items for pixel information, histogram information, image recognition information and audio information for each individual frame and for each pre-indexed frame for the pre-existing videos, respectively.

8. The method of claim 7, wherein in the step of comparing the plurality of metadata items of the received video file to the respective plurality of pre-indexed metadata items for the one of the pre-indexed frames, the respective numeric value is assigned for each comparison based on an amount by which the respective metadata items of the individual frame for the pixel information, the histogram information, the image recognition information and the audio information match the respective pre-indexed metadata items for the pixel information, the histogram information, the image recognition information and the audio information of the pre-indexed frame.

9. The method of claim 8, wherein in assigning the respective numeric values for the comparisons of the plurality of metadata items of the individual frame of the received video file and the respective plurality of pre-indexed metadata items for the pre-indexed frame, the relative values of the pixel information, the histogram information, the image recognition information and the audio information are weighted.

10. The method of claim 8, wherein in the step of comparing the metadata, the single value having a greatest value identifies a best match.

11. An article of manufacture comprising a non-transitory machine readable medium and executable instruction embodied in the medium for configuring a computer to perform the method of claim 6.

12. A system, comprising:
a video imaging device configured to capture a video file comprising a plurality of frames;
a mobile device coupled to the video imaging device configured to send said video file through a mobile communication network to a server;
a database configured to store pre-indexed metadata of pre-indexed frames of pre-existing videos, wherein a plurality of pre-indexed metadata items are stored for each pre-indexed frame;
a video analyzer associated with the server, configured to:
  separate the video file received from the wireless communication device into individual frames,
  convert the individual frames into metadata for the video file, wherein each individual frame is converted into a plurality of metadata items corresponding to the plurality of pre-indexed metadata items, and
  for each of a plurality of the pre-indexed frames of each of a plurality of the pre-existing videos, compare the plurality of metadata items for one individual frame of the video file to the respective pre-indexed metadata items of the pre-indexed frame of the pre-existing video stored in the database by:
    generating a plurality of numeric values each numeric value representing an amount by which each of the metadata items for the individual frame matches a respective pre-indexed metadata item for the pre-indexed frame, and
    combining the plurality of numeric values into a single value;
  identify one of the pre-existing videos as corresponding to the received video based on the plurality of single values corresponding to the plurality of pre-indexed frames of the plurality of existing videos,
  select ones of the plurality of metadata items in the individual frame and the pre-indexed frame of the identified pre-existing video for which the numeric values exceed a predetermined value;
  compare a next video frame following the individual frame of the video file to a next pre-indexed video frame following the pre-indexed video frame in the identified pre-indexed video by:
    generating a plurality of further numeric values, each further numeric value representing an amount by which each of the selected metadata items of the next frame matches the respective metadata item in the next pre-indexed video frame; and combining the plurality of further numeric values into a further single value; and when a combination of the single value and the further single value is greater than a threshold, send a message containing information about the identified pre-existing video back to the mobile device.

13. The system of claim 12, wherein the plurality of metadata items for the video file and the plurality of pre-indexed metadata items include respective metadata items for pixel information, histogram information, image recognition information and audio information for each individual frame and for each pre-indexed frame for the pre-existing videos, respectively.

14. The system of claim 13, wherein the video analyzer assigns the respective numeric values to the comparisons of the plurality of metadata items for the individual frame of the video file to the plurality of pre-indexed metadata items for the pre-indexed frame based on an amount by which the respective metadata items of the individual frame for the pixel information, the histogram information, the image recognition information and the audio information match the respective pre-indexed metadata items for the pixel information, the histogram information, the image recognition information and the audio information of the pre-indexed frame.

15. The system of claim 14, wherein in assigning the respective numeric values for the comparisons of the plurality of metadata items for the individual frame of the video file and the respective plurality of pre-indexed metadata items, the relative values of the pixel information, the histogram information, the image recognition information and the audio information are weighted.

16. The system of claim 14, wherein in the comparing of the metadata, the single value having a greatest value identifies a best match.

* * * * *